(12) United States Patent
Chen

(10) Patent No.: US 6,491,232 B1
(45) Date of Patent: Dec. 10, 2002

(54) SWINGING GARDEN SPRINKLER

(75) Inventor: Chin-Yuan Chen, Chang-Hua Hsien (TW)

(73) Assignee: Shin Tai Spurt Water of the Garden Tools Co., Ltd., Chang-Hua Hsien (TW)

( * ) Notice: Subject to any disclaimer, the term of this patent is extended or adjusted under 35 U.S.C. 154(b) by 4 days.

(21) Appl. No.: 09/903,907

(22) Filed: Jul. 13, 2001

(51) Int. Cl.[7] .............................................. B05B 17/08
(52) U.S. Cl. ....................... 239/17; 239/211; 239/263.1
(58) Field of Search ........................ 239/17, 200, 207, 239/225.1, 227, 243, 246, 263.1, 548

(56) References Cited

U.S. PATENT DOCUMENTS 5,261,603 A * 11/1993 Driska .......................... 239/211
6,053,422 A * 4/2000 Polzin et al. .................. 239/17
6,179,218 B1 * 1/2001 Gates ............................ 239/17

* cited by examiner

Primary Examiner—Lisa A. Douglas
(74) Attorney, Agent, or Firm—Harrison & Egbert

(57) ABSTRACT

A garden sprinkler includes a housing member, a driving member, a transmission member, and two spray members. The housing member is provided with a receiving space in which the driving member and the transmission member are mounted such that the driving member is engaged with the transmission member. The two spray members are fastenend pivotally to the housing member and are engaged with the transmission member. The spray members are actuated by the transmission member to swing up and down to bring about a uniform irrigation of a garden, lawn, golf course, and the like.

6 Claims, 11 Drawing Sheets

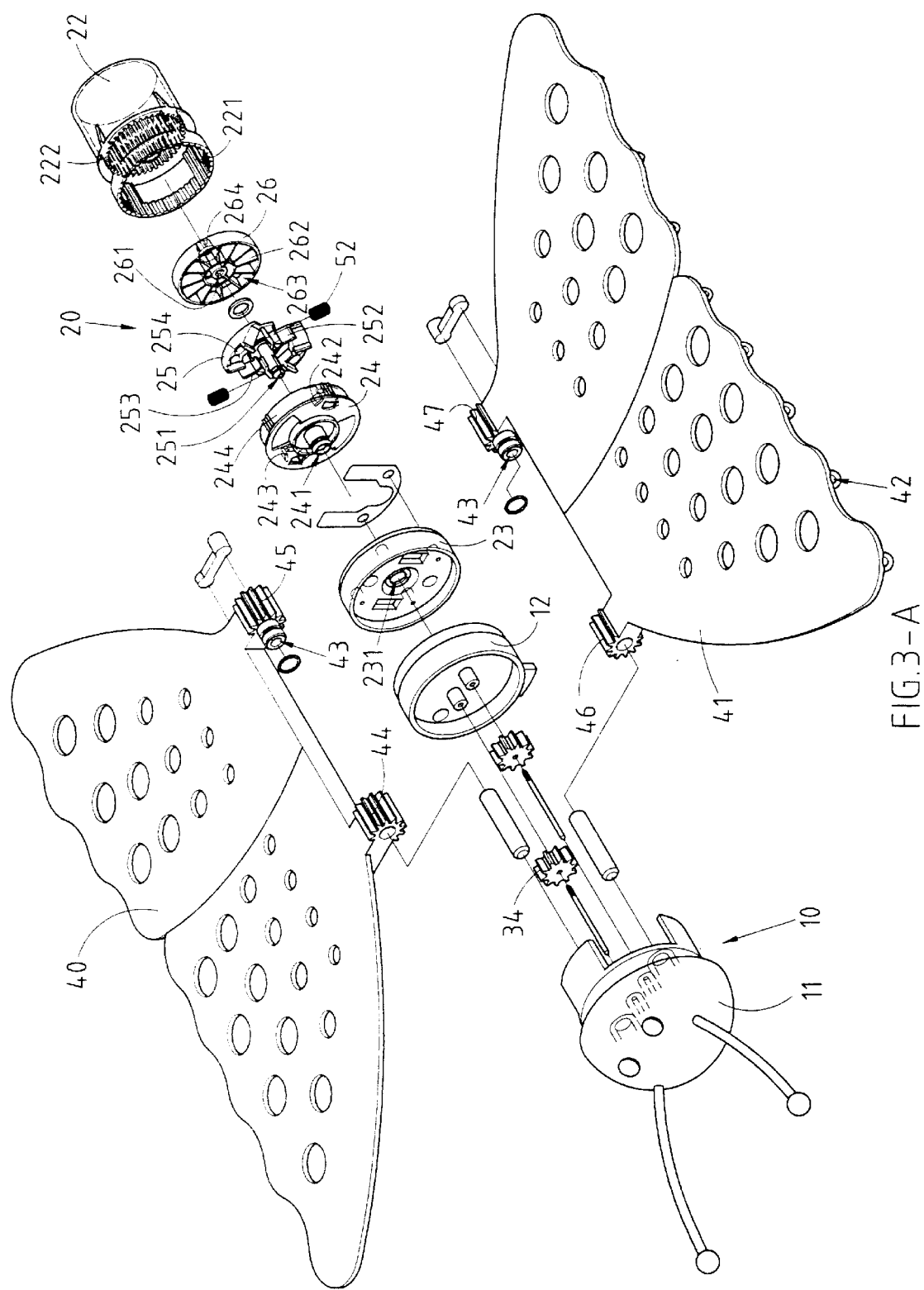
FIG.3-A

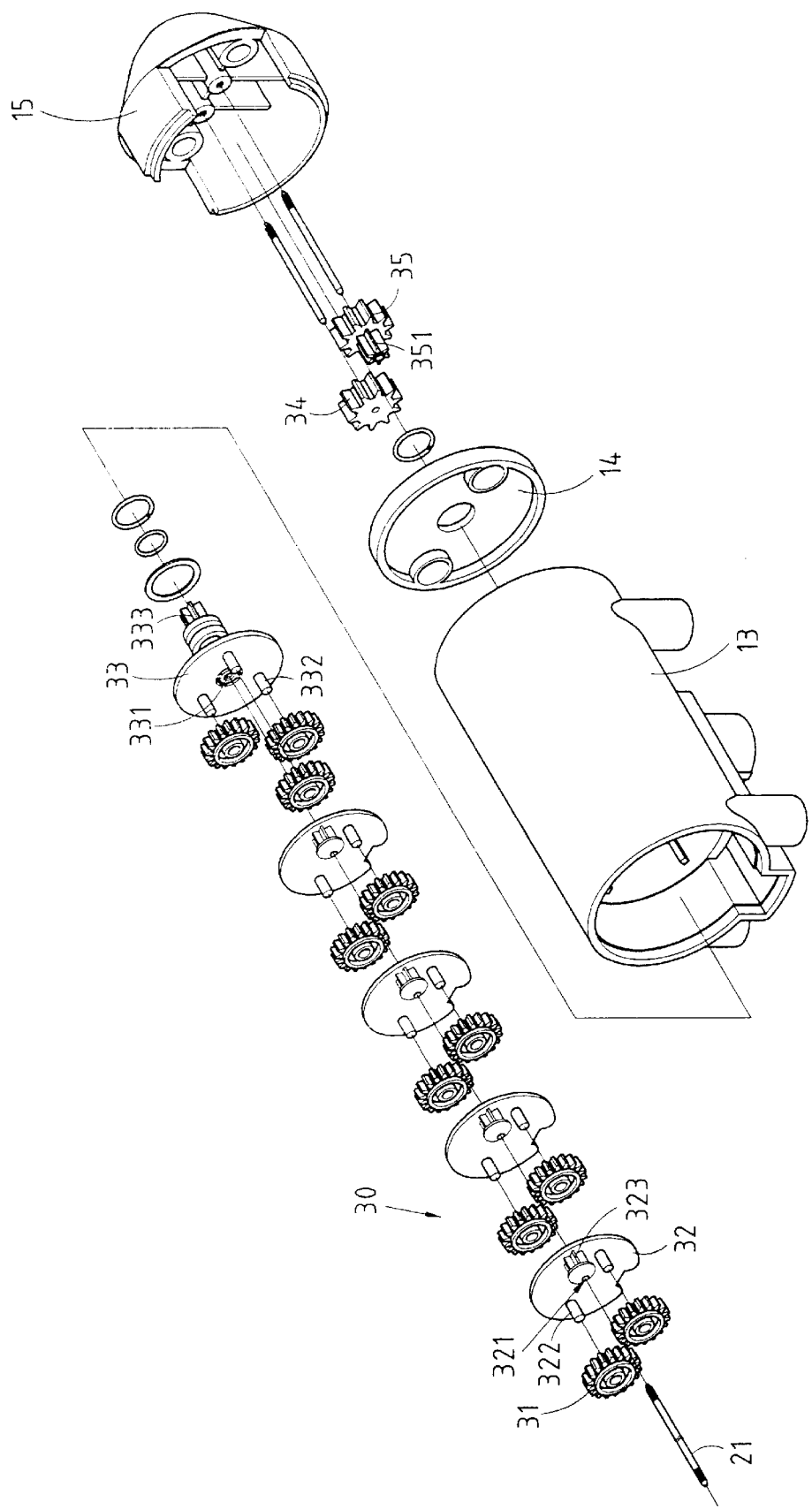
FIG.3-B

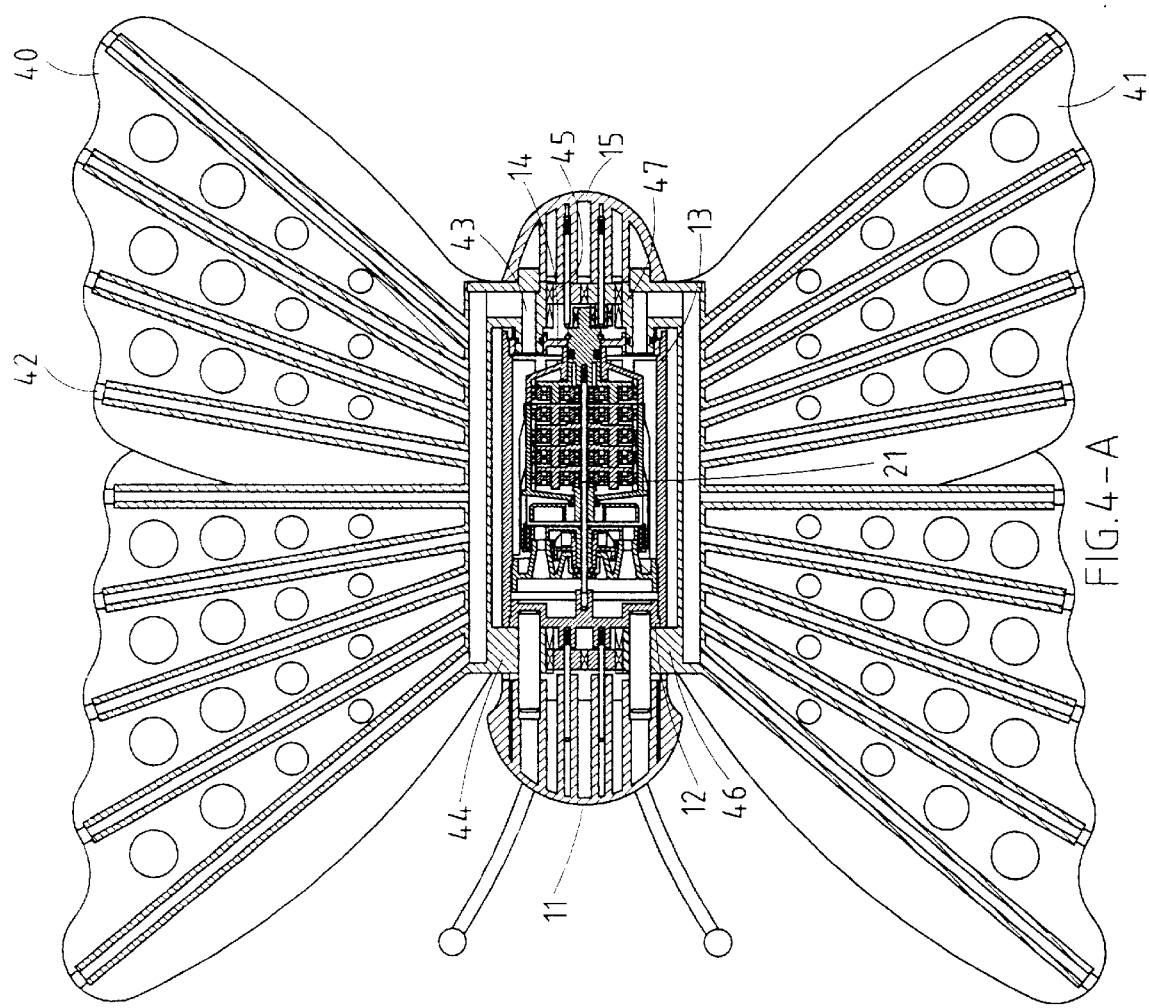

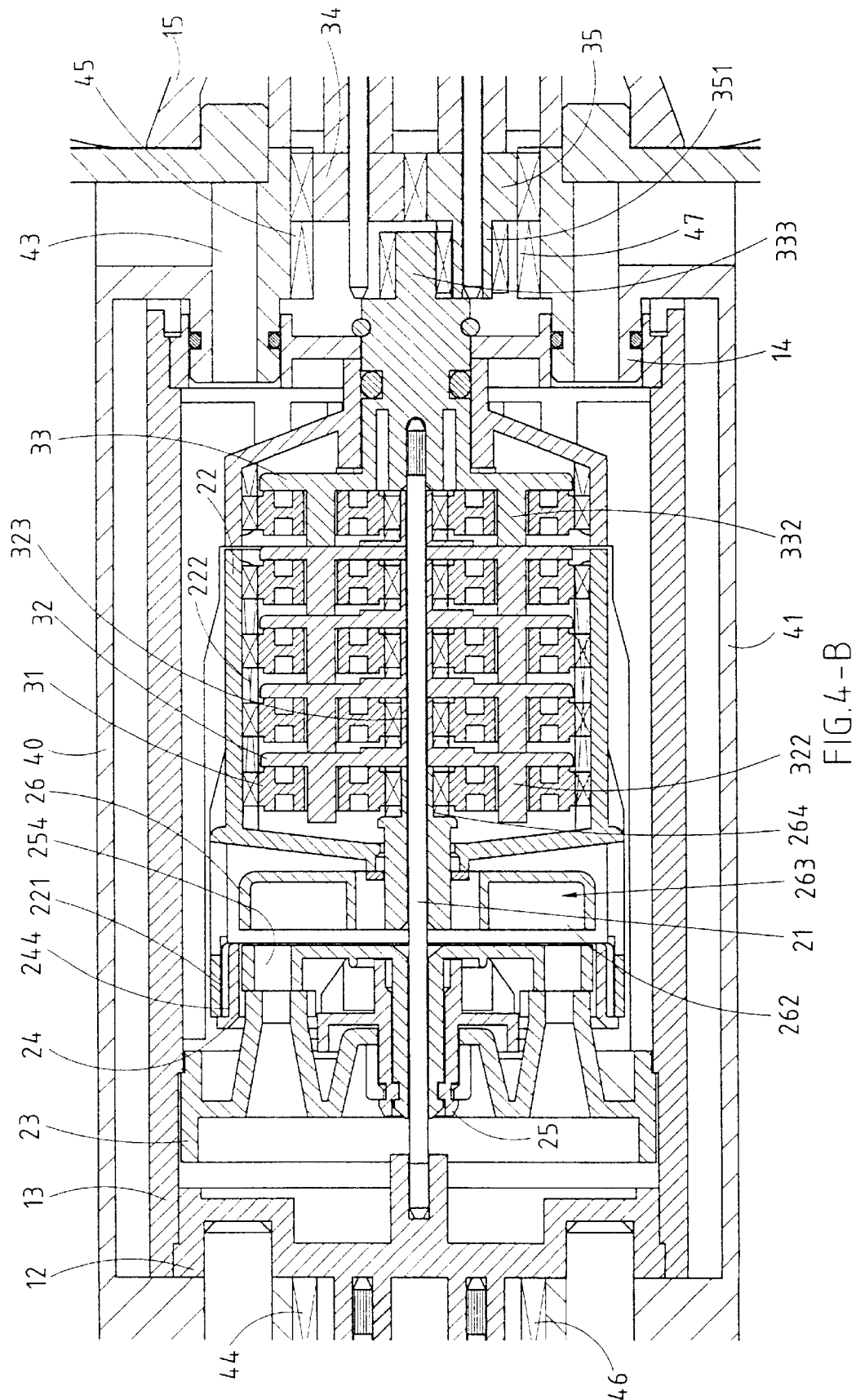
FIG.4-B

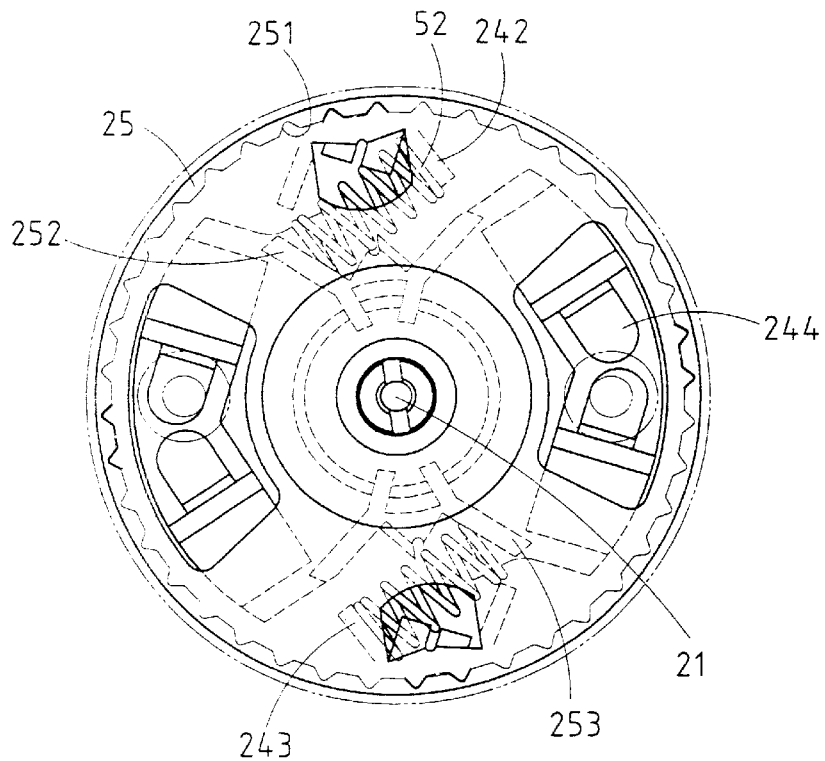
FIG.7-A
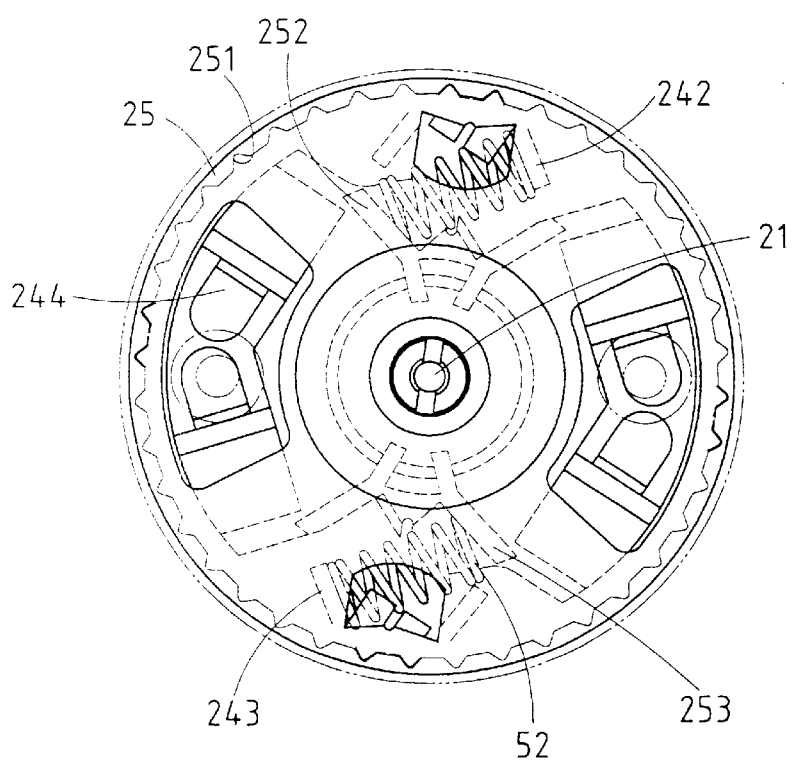
FIG.7-B

SWINGING GARDEN SPRINKLER

BACKGROUND OF THE INVENTION

1. Field of the Invention

The present invention relates generally to a gardening implement, and more particularly to a garden sprinkler.

2. Description of Related Art

There are a variety of garden sprinklers available in the market place today. These conventional garden sprinklers are generally defective in design in that they are incapable of a uniform irrigation of garden, lawn, golf course, etc., thereby resulting in waste of water.

BRIEF SUMMARY OF THE INVENTION

The primary objective of the present invention is to provide a swinging garden sprinkler which is capable of watering a lawn, garden, golf course, and the like in an even manner such that both over-irrigation and under-irrigation are averted.

In keeping with the principle of the present invention, the foregoing objective of the present invention is attained by a swinging garden sprinkler comprising a housing member, a driving member, a transmission member, and two spray members. The housing member is provided in the interior with a receiving space in which the driving member and the transmission member are disposed. The two spray members are pivoted to the housing member such that the spray members are engaged with the transmission member. The spray members are capable of changing the spray angle from time to time so as to avert the over-irrigation and the under-irrigation, thereby resulting in an efficient utilization of water resource.

The objective, features, functions and advantages of the present invention will be more readily understood upon a thoughtful deliberation of the following detailed description of the present invention with reference to the accompanying drawings.

BRIEF DESCRIPTION OF THE SEVERAL VIEWS OF THE DRAWINGS

FIG. 3A shows a second exploded view of the present invention.

FIG. 3B shows a third exploded view of the present invention.

FIG. 4A shows a first sectional view of the present invention.

FIG. 4B shows a first sectional view of the present invention.

FIG. 7A shows a schematic view of the resent invention in action.

FIG. 7B shows another schematic view of the present invention in action.

DETAILED DESCRIPTION OF THE INVENTION

Figure 1:
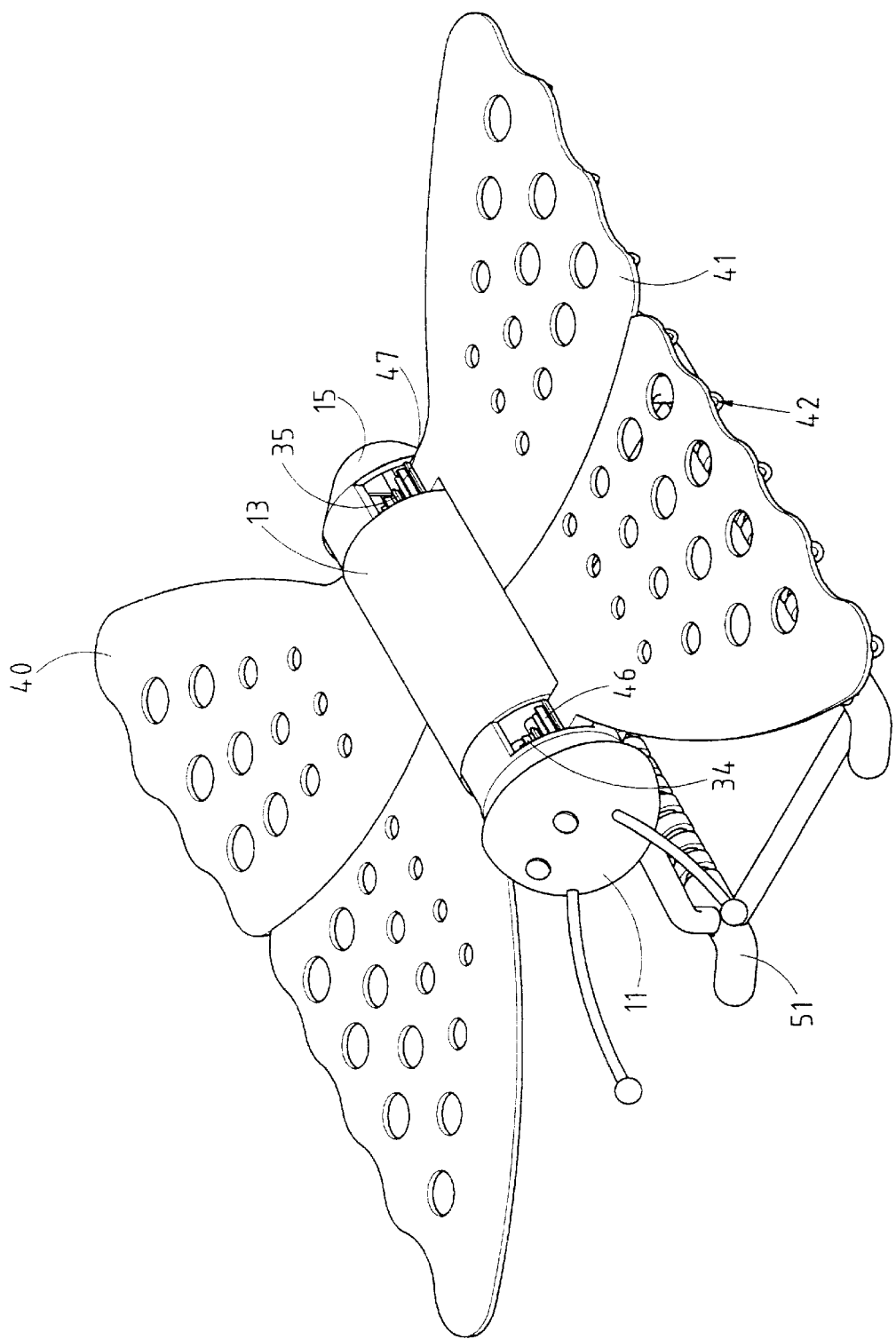
FIG. 1 shows a perspective view of the present invention.
Figure 2:
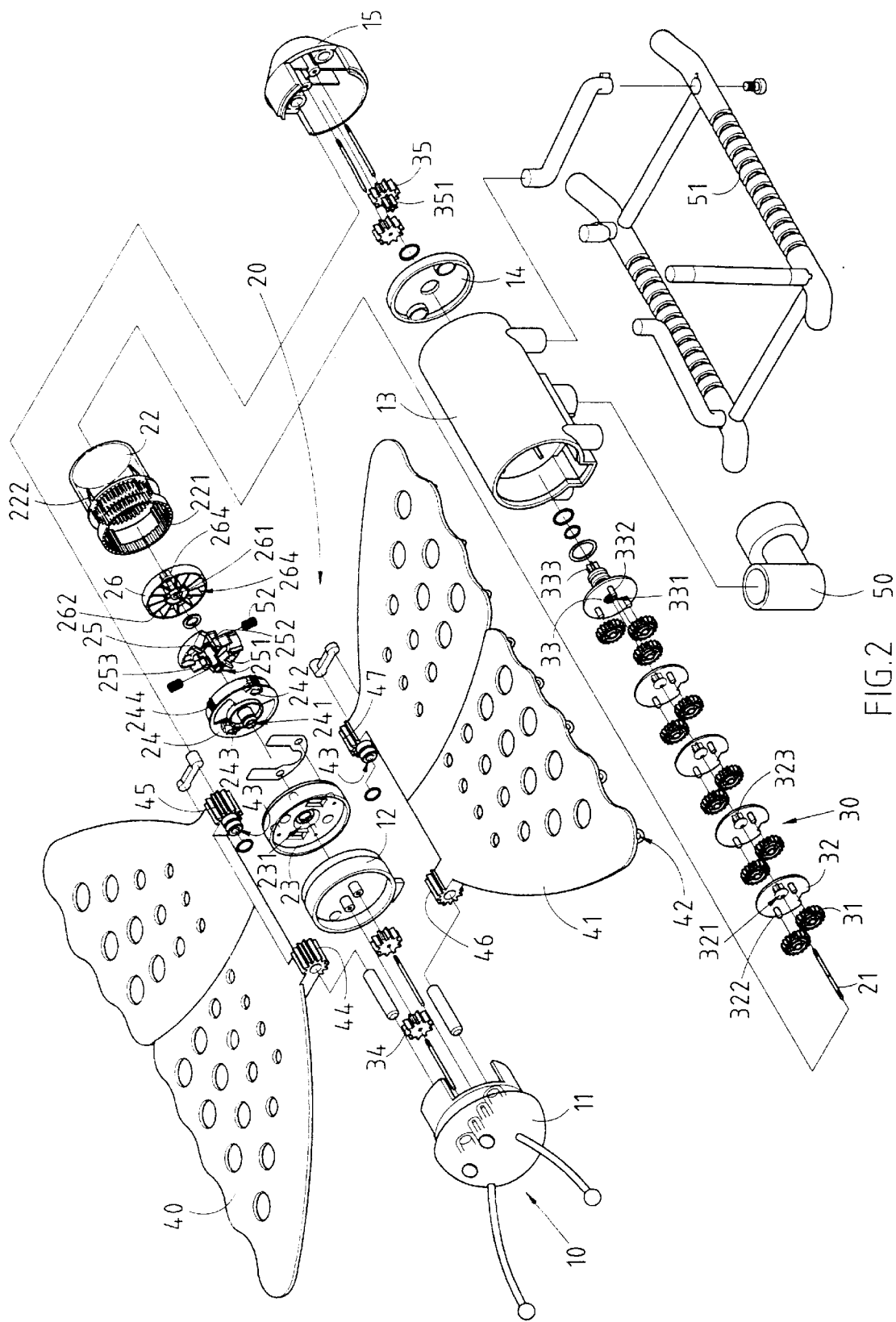
FIG. 2 shows a first exploded view of the present invention.

As shown in all drawings provided herewith, a garden sprinkler embodied in the present invention comprises a housing member 10, a driving member 20, a transmission member 30, and two spray members 40 and 41.

The housing member 10 is formed of a plurality of housing pieces 11, 12, 13, 14, and 15, which form and define jointly a receiving space (not shown in the drawings) in which the driving member 20 and the transmission member 30 are mounted. The housing member 10 is provided with a water inlet 50 which is connected at one end with a water hose. The housing member 10 is mounted on a support frame 51.

The driving member 20 is formed of a plurality of driving pieces which are provided with a pivoting hole and a water hole and are located by a locating shaft 21. The driving pieces are further provided with an engagement gear.

The transmission member 30 is formed of a plurality of transmission pieces which are located by the locating shaft 21 and are provided with an engagement gear. The transmission member 30 is engaged with the driving member 20.

The spray members 40 and 41 are provided with a water admitting port 43 and a water discharging port 42. The spray member 40 is provided with two engagement gears 44 and 45, whereas the spray member 41 is provided with two engagement gears 46 and 47. The spray members 40 and 41 are engaged with the transmission member 30.

The driving member 20 further comprises a locating member 22, a locating shaft 21, a water admitting member 23, a press member 24, a water distributing member 25, and a revolving member 26. The locating shaft 21 is put through the through holes 231, 241, 251, and 261 of the transmission member 30 and the driving member 20. Two elastic elements 52 are slantingly disposed by the disposing blocks 242, 243, 252, 253 of the press member 24 and the water distributing member 25. The revolving member 26 is provided with an engagement gear 264 which is engaged with the transmission member 30. The revolving member 26 is provided in the interior with a plurality of ribs 262 which are circularly arranged at an interval 263. The water admitting member 23, the press member 24, the water distributing member 25, and the revolving member 26 are disposed in the locating member 22 of a cylindrical construction. The press member 24 is provided along the fringe with a plurality of retaining blocks 244. The locating member 22 is provided in the inner wall with a plurality of retaining slots 221 for retaining the retaining blocks 244 of the press member 24. The locating member 22 is further provided in the inner wall with an inner engagement gear 222 for engaging the transmission member 30, as shown in FIGS. 2, 3A, 4B, 7A, and 7B.

The transmission member 30 may further comprise a plurality of transmission gears 31, pivoting disk members 32, and action gears 34, as well as a transmission disk member 33 and an action carrying gear 35. The pivoting disk members 32 are provided with two pivots 322 for pivoting the transmission gears 31, and are further provided with a gear shaft 323 for engaging the two transmission gears 31. The pivoting disk members 32 are provided with a through hole 321 for receiving therethrough the locating shaft 21. The transmission gears 31 are engaged with the inner engagement gear 222 of the locating member 22. The two action gears 34 are engaged with the engagement gears 44 and 46 of the spray members 40 and 41. The action gear 34 and the action carrying gear 35 are engaged with the engagement gears 45 and 46 of the spray members 40 and 41. The action carrying gear 35 has a stepped gear 351 which is engaged with the gear shaft 333 of the transmission disk member 33, as shown in FIGS. 2, 3B, 4B, and 6.

Figure 5:
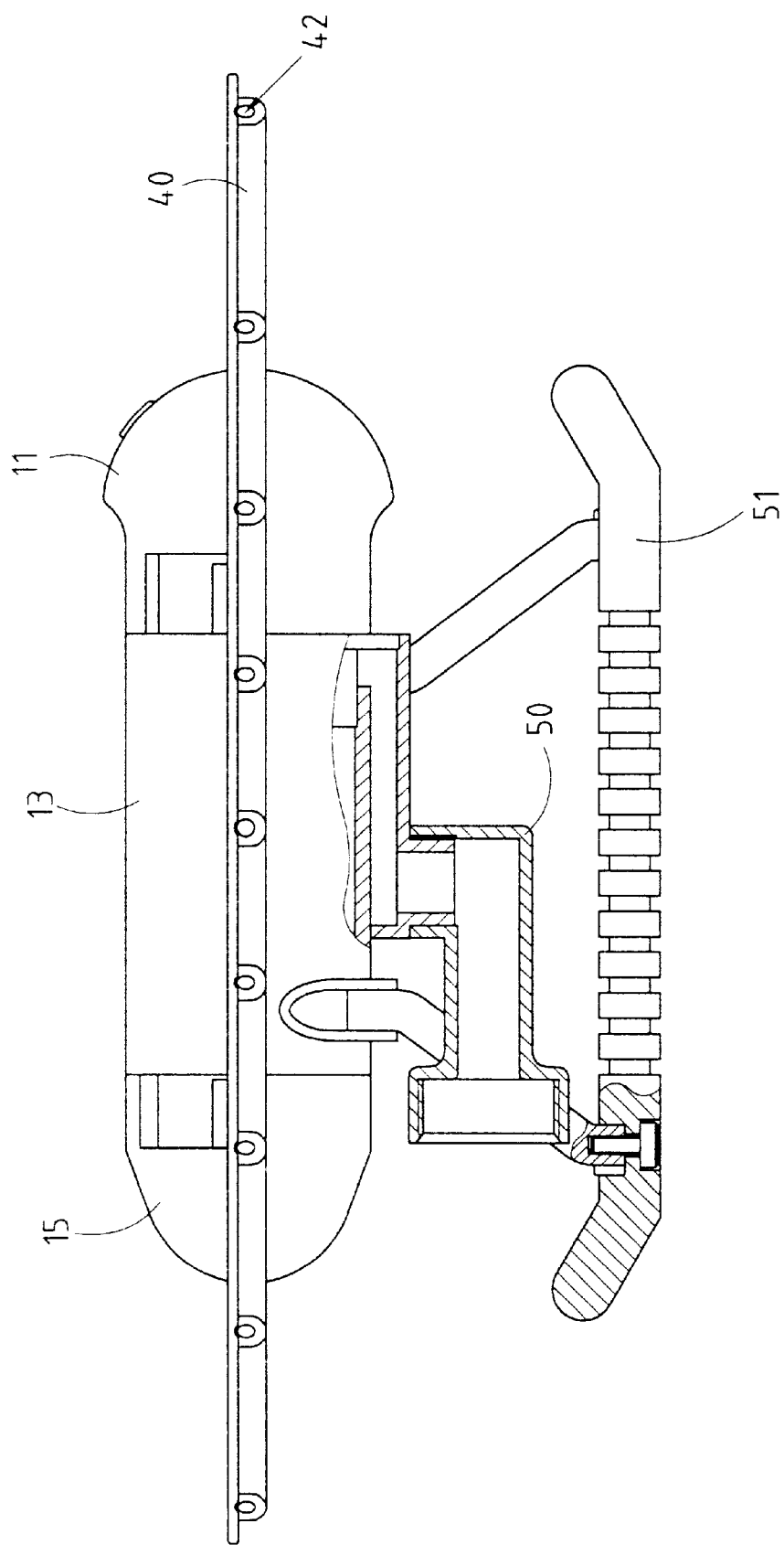
Fig. 5 shows a third sectional view of the the present invention.
Figure 6:
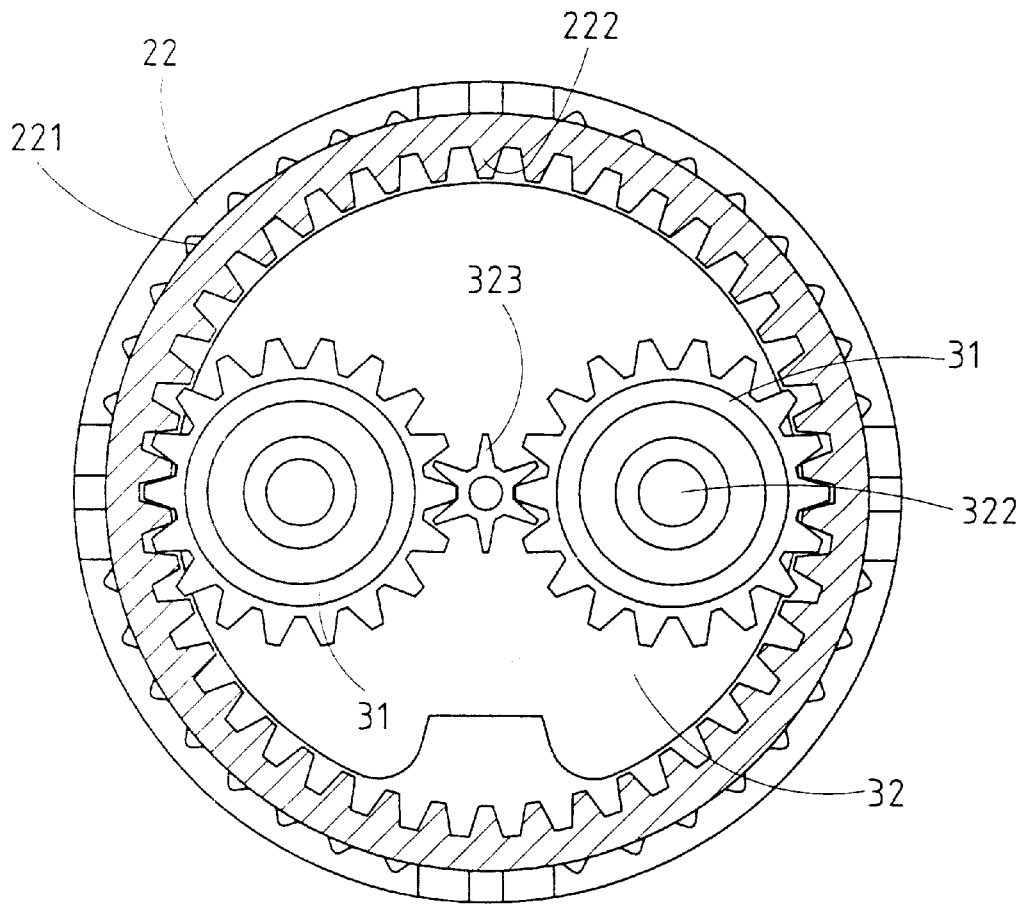
FIG. 6 shows a fourth sectional view of the present invention.
Figure 8:
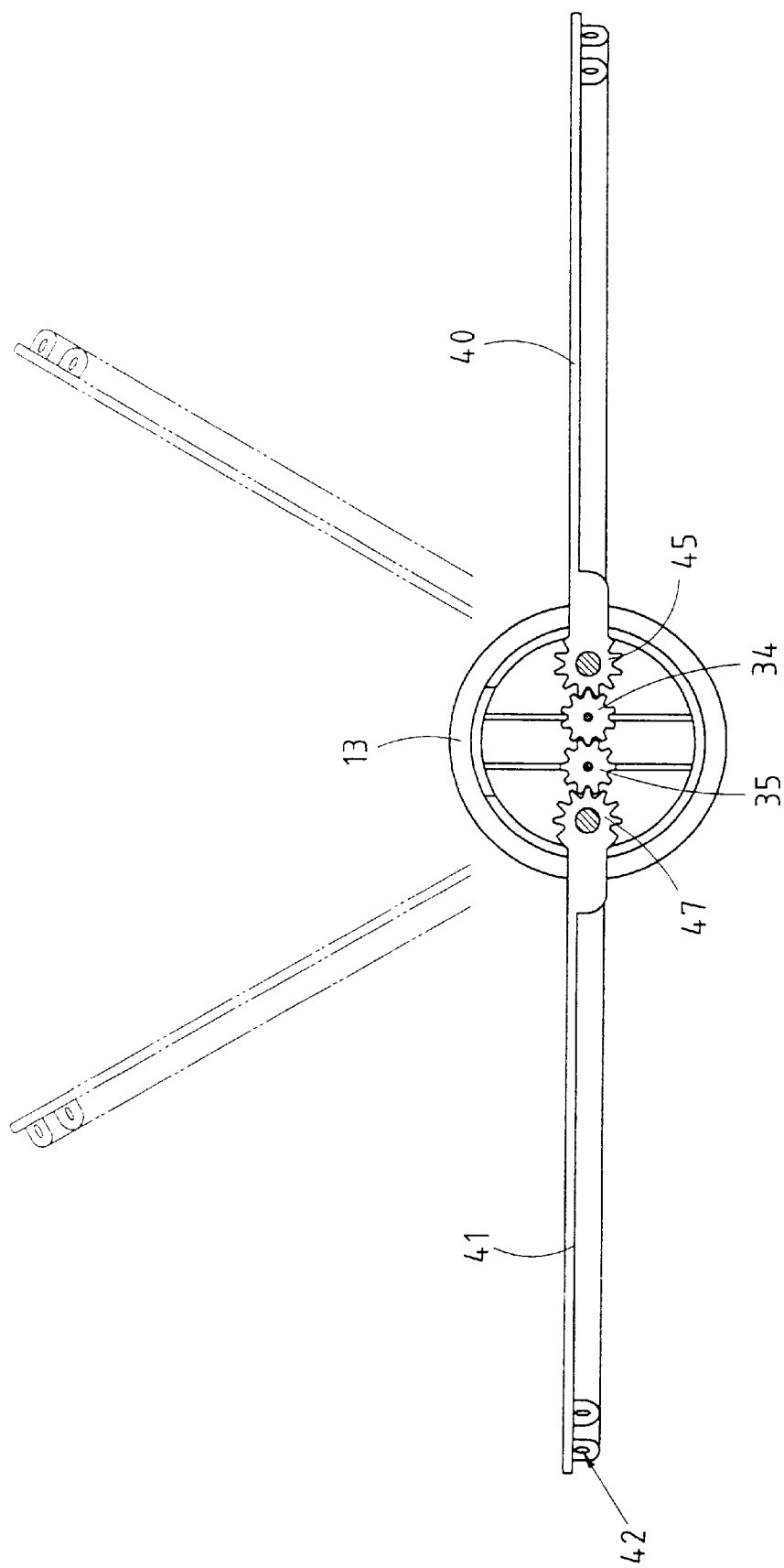
FIG. 8 shows a schematic view of the present invention in use.
Figure 9:
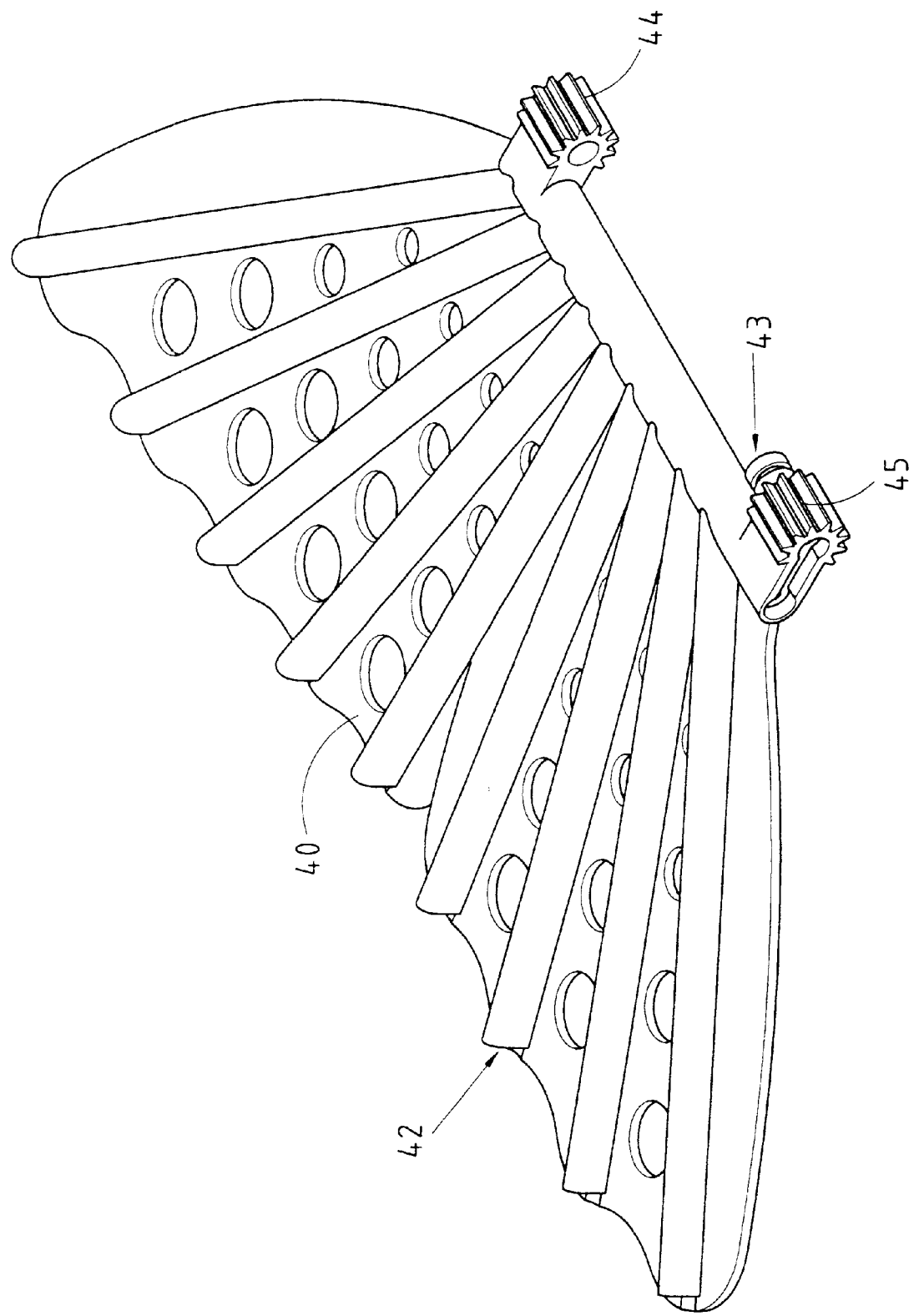
FIG. 9 shows a schematic view of the back sides of the spray members of the present invention.

As shown in FIGS. 4A, 4B, and 5, the housing pieces 12, 13 and 14 of the housing member form a receiving space which is in communication with the atmospheric air via the water inlet 50.

The housing member 10 and the water inlet 50 of the swinging garden sprinkler of the present invention are made integrally.

The water distributing member 25 of the swinging garden sprinkler of the present invention is provided with at least two water distributing holes 254 which are different in angle.

In operation, water enters the receiving space of the housing member 10 via the water inlet 50. The water flows into the spray members 40 and 41 via the water admitting ports 43 before the water is emitted via the water discharging ports 42. In the meantime, the revolving member 26 is driven to revolve as the water enters the intervals 263 of the revolving member 26 via the water distributing holes 254 of the water distributing member 25. The gear shaft 264 of the revolving member 26 actuates the transmission gear 31 of the transmission member 30 to turn on the pivot 322 along the inner engagement gear 222 of the locating member 22. The motion brought about by the revolving member 26 is then imparted to the transmission disk member 33, which is actuated to turn such that its gear shaft 333 actuates the stepped gear 351 to turn, thereby causing the action carrying gear 35 and the action gear 34 to actuate the two spray members 40 and 41 to swing up and down, as illustrated in FIGS. 3A, 3B, 4A, 4B, 5, and 6. When the transmission gear 31 is in motion, the locating member 22 turns in the direction opposite to the direction in which the revolving member 26 turns. In light of the retaining blocks 244 of the press member 24 being located in the retaining slots 221 of the locating member 22, and the disposing blocks 242, 243, 252 and 253 being provided with two elastic element 52, when the spray members 40 and 41 revolve to arrive at the highest point, the water is caused by the water admitting member 23 to enter another water distributing hole to cause the revolving member 26 to turn in reverse, thereby actuating the spray members 40 and 41 to swing downward. Thereafter, the spray member 40 and 41 resume the upward movement as described above.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following claims.

I claim:

1. A swinging garden sprinkler comprising:
    a housing member comprised of a plurality of housing pieces which form jointly a receiving space, said housing member being provided with a water inlet which is connected at one end with a hose, said housing member being mounted on a support frame;
    a driving member disposed in said receiving space of said housing member and comprised of a plurality of driving pieces which are comprised of a pivoting hole and a water hole and are located by a locating shaft, said driving pieces further provided with an engagement gear;
    a transmission member disposed in said receiving space of said housing member and comprised of a plurality of transmission pieces which are located by said locating shaft and are provided with an engagement gear, said transmission member being engaged with said driving member; and
    two spray members comprised of a water admitting port, a water discharging port, and two engagement gears, said spray members being engaged with said transmission member to swing up and down.

2. The swinging garden sprinkler as defined in claim 1, wherein said driving member is further comprised of a locating member, a locating shaft, a water admitting member, a press member, a water distributing member, and a revolving member, said locating shaft being put through a plurality of through holes of said transmission member and said driving member, said press member and said water distributing member further comprising a plurality of disposing blocks for disposing slantingly two elastic elements, said revolving member provided with an engagement gear which is engaged with said transmission member, said revolving member provided with a plurality of ribs which are circularly arranged at an interval, said water admitting member, said press member, said water distributing member and said revolving member being disposed in said locating member, said press member being provided with a plurality of retaining blocks, said locating member being provided with a plurality of retaining slots for retaining said retaining blocks of said press member, said locating member further provided in an inner wall with an inner engagement gear for engaging said transmission member.

3. The swinging garden sprinkler as defined in claim 1, wherein said transmission member is further comprised of a plurality of transmission gears, pivoting disk members, and action gears, as well as a transmission disk members, and an action carrying gear, said pivoting disk members being further comprised of two pivots for pivoting said transmission gears, and a gear shaft for engaging said transmission gears, said pivoting disk members being provided with a through hole for receiving said locating shaft, said transmission gears being engaged with said inner engagement gear of said locating member, said action gears being engaged with said engagement gears of said two spray members, said action gear and said action carrying gear being engaged with said engagement gears of said spray members, said action carrying gear having a stepped gear which is engaged with said gear shaft of said transmission disk member.

4. The swinging garden sprinkler as defined in claim 1, wherein said housing pieces of said housing member comprise a receiving space which is in communication with the atmospheric air via said water inlet.

5. The swinging garden sprinkler as defined in claim 1, wherein said housing member and said water inlet are made integrally.

6. The swinging garden sprinkler as defined in claim 2, wherein said water distributing member is comprised of at least two water distributing holes which are different form each other in angle.

* * * * *